United States Patent [19]

Groenendaal et al.

[11] 4,004,885
[45] Jan. 25, 1977

[54] REMOVAL OF SULFUR OXIDES AND PARTICULATE MATTER FROM WASTE GAS STREAMS

[75] Inventors: Willem Groenendaal; Friedrich C. Taubert, both of The Hague; Jaap E. Naber; Gijsbertus A. Bekker, both of Amsterdam, all of Netherlands

[73] Assignee: Shell Oil Company, Houston, Tex.

[22] Filed: Mar. 15, 1976

[21] Appl. No.: 666,827

Related U.S. Application Data

[62] Division of Ser. No. 467,530, May 6, 1974, Pat. No. 3,966,879.

[30] Foreign Application Priority Data

May 8, 1973   United Kingdom ............. 21848/73

[52] U.S. Cl. .................................. 23/260; 23/284; 55/99; 55/282; 55/390; 55/479; 432/72
[51] Int. Cl.² .................. B01D 41/02; B01D 46/32; B01J 8/12
[58] Field of Search ............. 423/244; 23/260, 284; 55/73, 99, 282, 390, 479; 432/14, 16, 72

[56] References Cited

UNITED STATES PATENTS

| | | | |
|---|---|---|---|
| 3,280,537 | 10/1966 | Hagendoorn | 55/390 X |
| 3,405,508 | 10/1968 | Peters et al. | 55/73 |
| 3,497,328 | 2/1970 | Calvert | 23/260 X |
| 3,501,897 | 3/1970 | VanHelden et al. | 423/244 X |
| 3,716,969 | 2/1973 | Maeda | 55/390 |
| 3,717,976 | 2/1973 | Gappa et al. | 55/73 |
| 3,913,253 | 10/1975 | Juntgen et al. | 423/244 |

*Primary Examiner*—Joseph Scovronek
*Attorney, Agent, or Firm*—Dean F. Vance

[57] ABSTRACT

An apparatus for the removal of particulate matter and sulfur oxides from waste gases is disclosed. The apparatus comprises a vessel for cross-current contacting of the waste gas with a moving bed of acceptor for sulfur oxides, and separate processing chambers for removal of the particulate matter from the loaded acceptor, for the removal of sulfur oxides for the loaded acceptor, and for reactivating the acceptor.

1 Claim, 5 Drawing Figures

REMOVAL OF SULFUR OXIDES AND PARTICULATE MATTER FROM WASTE GAS STREAMS

This is a division of application Ser. No. 467,530, filed May 6, 1974, now U.S. Pat. No. 3,966,879, issued June 29, 1976.

BACKGROUND OF THE INVENTION

This invention relates to a process for the removal of particulate matter and sulfur oxides from waste gases such as flue gas. The invention also relates to an apparatus for carrying out such a process.

Because of increasingly stringent requirements on the abatement of air pollution, the removal of sulfur oxides from gas mixtures, in particular from hot waste gases containing relatively small amounts of sulfur oxides, such as flue gases and gases originating from roasting processes, has in the past few years become of great concern and technical importance.

In many cases these waste gases also contain particulate matter, in particular when they emerge from roasting processes or from electrical power plants (coal-fired and sometimes oil-fired ones), which must also be removed from the waste gases. It is possible to remove the particulate matter, which, generally, consists of small particles and is called "fly ash," from the waste gases before or after the removal of the sulfur oxides, e.g., by filtration, with cyclones or by electrostatical precipitation. Such measures, however, require large capital investment in addition to the capital cost of the separate facilities for sulfur oxide removal. Further, even with this very large capital investment there is no assurance of complete success since the state of the art on particulate matter removal is not sufficiently advanced to assure trouble-free operation in all instances.

Accordingly, it would be very desirable if a process could be developed for the removal of both particulate matter and sulfur oxides from waste gases, in which there is no need for costly separate installations for the removal of particulate matter.

SUMMARY OF THE INVENTION

It has now been found that supported, copper-containing acceptors for sulfur oxides will function very effectively to remove both sulfur oxides and particulate matter from waste gases in the same processing zone under reaction conditions required for sulfur oxide acceptance provided such acceptors are employed in particulate form in a moving bed which contacts the waste gas stream in cross-current fashion. Further, it has also been found that copper-containing acceptors which are loaded with sulfur oxides and particulate matter by this cross-current contacting procedure can be readily processed into a reuseable form by passing the loaded acceptor through separate zones for removal of the particulate matter and the sulfur oxides, with final activation of the sulfur oxide acceptance sites being carried out in situ in the sulfur oxide and particulate matter removal zone or, optionally, in an additional separate zone positioned subsequent to the removal zones. Accordingly, the instant invention provides a process for the removal of sulfur oxides and particulate matter from waste gases containing same which comprises A. contacting the waste gas stream under oxidative conditions in a sulfur oxide and particulate matter removal zone with a solid acceptor comprising copper or a copper compound or mixtures thereof supported on a particulate carrier, said contact being established by passing the waste gas at a temperature of from about 300° to 500° C cross-currently through a moving bed of the solid acceptor, thereby accepting the sulfur oxide on said acceptor and filtering out the particulate matter to afford an acceptor loaded with sulfur oxides and particulate matter and a waste gas stream substantially free of both sulfur oxides and particulate matter;

B. removing the particulate matter from the loaded acceptor in a first separation zone wherein the acceptor loaded with both sulfur oxides and particulate matter is stripped of particulate matter by transporting the loaded acceptor through a stream of an inert stripping gas;

C. separating the sulfur oxides from the acceptor product of the first separation zone by contacting the acceptor with a reducing gas at a temperature between 300°–500° C in a second separation zone whereby the sulfur oxides bound to the acceptor are released as $SO_2$ gas and D. returning the acceptor product of the second separation zone into cross-current contact with said waste gases under oxidative conditions in the sulfur oxide and particulate matter removal zone. In an alternative aspect of the process of the invention, the acceptor product of the second separation zone from which sulfur oxides have at least partly, and in most cases substantially completely been removed, is reactivated by contacting it with an oxidizing agent, preferably an oxygen-containing gas, in an activation zone before its introduction into the sulfur oxide and particulate matter removal zone.

DESCRIPTION OF THE PREFERRED EMBODIMENTS

Figure 1:
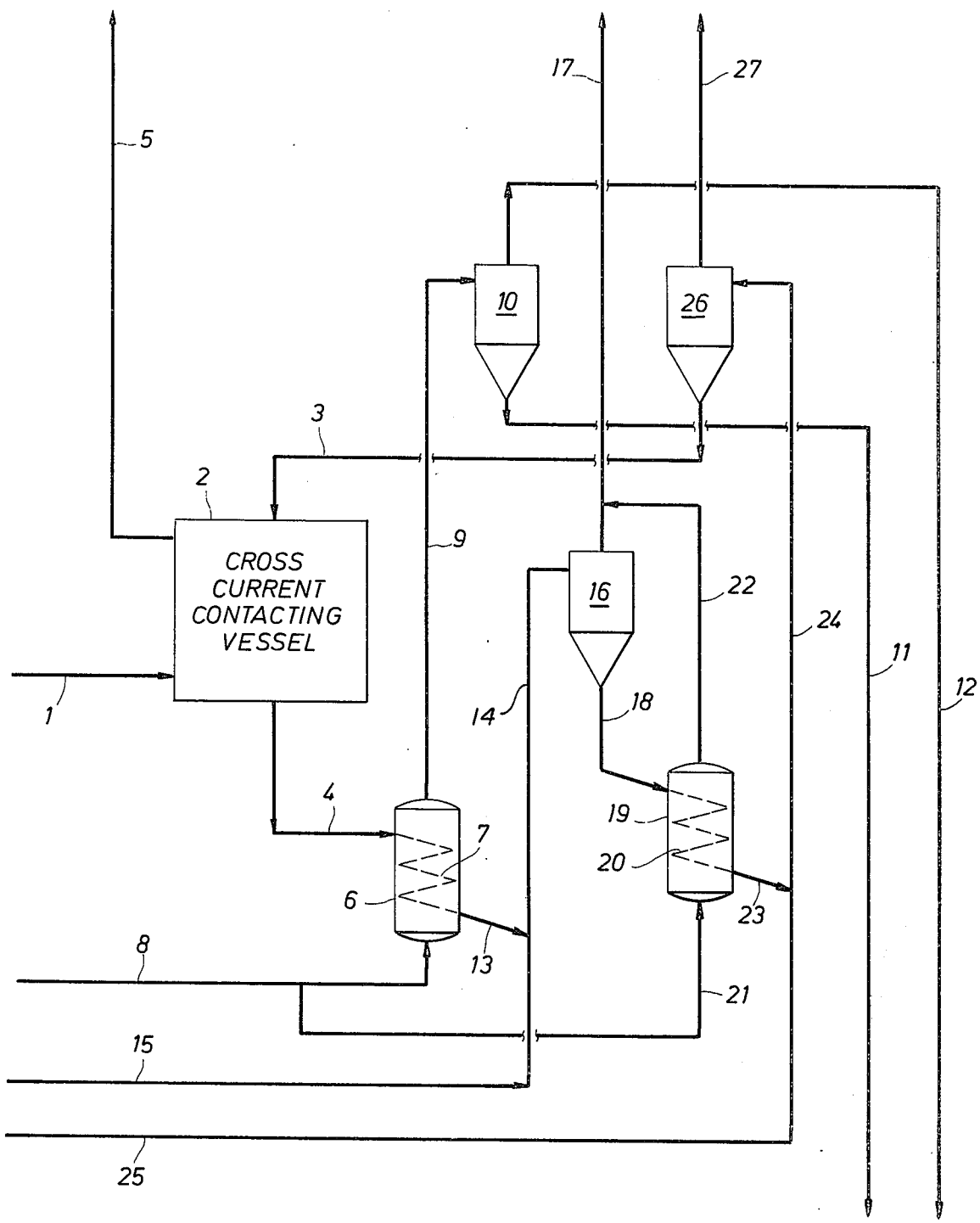
Figure 3:
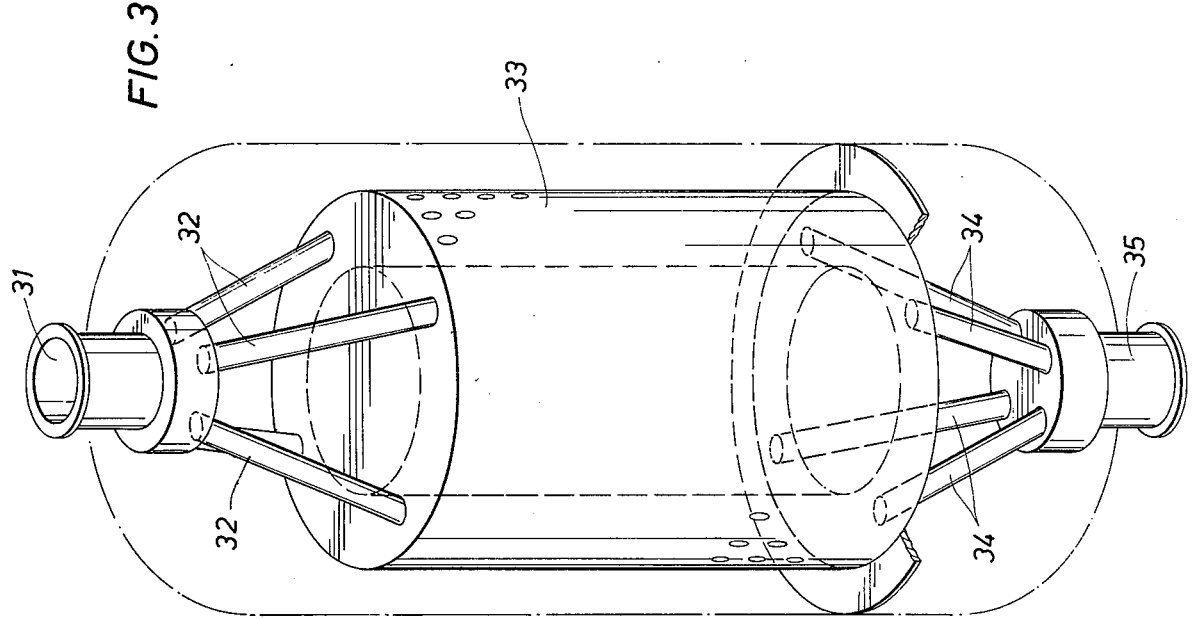

In the first zone the supported, copper-containing acceptor is to be brought into intimate contact with the waste gas to be treated, by passing the waste gas cross-currently through a moving bed of acceptor particles. By the employment of this contacting technique it has been found that essentially complete trapping of the particulate matter can be accomplished such that little or no particulate matter passes the moving acceptor bed while at the same time maintaining the effectiveness of the acceptor to contact and absorb the sulfur oxides present in the waste gas. This finding is surprising since previously it had been considered impossible under practical conditions to even employ a moving or fluidized bed of acceptor particles to remove $SO_2$ from gas streams containing particulate matter because of the clogging off of sulfur oxide acceptance sites by trapped particulate matter. However, the use of the cross-current contacting technique of the instant invention apparently limits the rate of fly ash and/or other particulate material deposition on the acceptor such that the acceptor is able to contact and accept substantially all of the sulfur oxides present in the waste gas prior to its becoming clogged off with particulate matter. Thus, the employment of the cross-current contacting procedure of the invention places an inherent limitation on the intimacy of contact between the waste gas and the moving acceptor bed which allows substantially complete acceptance of sulfur oxides and trapping of particulate matter to occur in the same processing operation. Of course, the extent of cross-current contact between the waste gas and the moving acceptor bed will vary widely depending on the type of waste gas which is being treated since the concentrations of both the sulfur oxides and the particulate matter relative to the total waste gas make-up and to each other will bear on the degree of cross-current contacting required to effect the desired removal. One skilled in the art will recognize that the proper degree of cross-current contacting can be readily ascertained in any given case by merely analyzing the product of the cross-current contacting procedure for sulfur oxides and particulate matter and varying process conditions, i.e., waste gas flow rate, moving bed velocity, density and thickness, etc., until the desired removal of sulfur oxides and particulate matter is achieved. For typical sulfur oxide and particulate matter-containing waste gases such as flue gas which generally contain relatively low concentrations, i.e., 0.1–5% v, of sulfur oxides and small quantities of particulate matter, i.e., 1–20 g per $nm^3$ of waste gas, it is preferred for practical reasons that the layer of the acceptor material to be passed by the waste gas be between about 25 and 100 cm thick. Under these conditions removal of sulfur oxides and particulate matter can be effected by passing the waste gas stream at a velocity of between about 1 m/sec and 7 m/sec into cross-current contact with the moving acceptor bed flowing at a rate of about 0.4 mm/sec to about 2.5 mm/sec; the specific velocities chosen being dependent on the thickness of acceptor layer employed.

The acceptor is very suitably used in the form of granules, spheres, pellets or the like, with diameters in the 1–5 mm range. The particulate matter in the waste gas, the particles of which generally have a diameter below 0.2 mm, or even below 0.05 mm, is readily filtered by the acceptor during the contact with the waste gas. If desired, part of the particulate matter (in particular the bigger particles) may be removed from the waste gas with a simple apparatus (e.g., a cyclone) prior to the contact of the waste gas with the acceptor in the first zone.

The acceptor should have a high mechanical strength in order to avoid the formation of a significant amount of small particles (fines) thereof by attrition during transport of the acceptor through the zones. It is preferred that the acceptor has a bulk crushing strength above 10 $kg/cm^2$. For this reason carrier materials based on reinforced refractory oxides are very suitable. Such a refractory oxide may comprise alumina, silica, zirconia and thoria and/or mixtures of two or more of these oxides. Silica-alumina, gamma-alumina and alpha-alumina are the most preferred carrier materials.

The copper or copper compound to be present on the carrier material is very suitably applied on the carrier material by impregnation with a solution comprising a copper compound. Aqueous solutions, in particular those containing copper sulphate and/or copper nitrate, are preferred. In order to increase the capacity of the acceptors for the acceptance of sulfur oxides it is of advantage to impregnate the carrier prior to or simultaneously with the solution of a copper compound with a solution of a compound of one or more of the metals zirconium, titanium, magnesium and in particular aluminum. This capacity for acceptance of sulfur oxides is still further enhanced by impregnation of the carrier material with a solution of an alkali metal compound, in particular a sodium salt, simultaneously with or after impregnation with the afore-mentioned solution of a compound or one or more of the metals zirconium, titanium, magnesium and aluminum. Very suitably the carrier is impregnated with a single aqueous solution containing salts of copper, aluminum and sodium, e.g., as a nitrate or sulfate.

After impregnation the carriers loaded with the desired metal compounds are dried and, if desired, heated to a temperature below 600° C, e.g., of from 350°–550° C. The acceptor preferably contains copper oxide as the copper compound. In cases where the calcination just mentioned does not lead to the formation of copper oxide (e.g., when the impregnation has been carried out with sulfates), it is of advantage to convert the copper compounds into the corresponding oxide by carrying out a procedure similar to that for the regeneration of the loaded acceptor as described below.

The amount of copper present in the acceptor very suitably ranges from 1–10% by weight of the acceptor, preferably from 2–7% by weight.

The temperature during contact between the waste gas and the acceptor in the first zone very suitably is in the range of from 300° to 500° C, with temperatures as high as 430° C and as low as 325° C being preferred. During contact oxidative conditions must prevail. This is generally accomplished by the presence of oxygen, which in most cases is present in the waste gases to be treated or otherwise may be provided by the addition of, e.g., air.

The waste gases which have been freed from particulate matter and sulfur oxides may be carried off through a stack.

The acceptor which is loaded after contact with the waste gas in the first zone with particulate matter and with sulfur oxides is removed from that zone. According to the invention it has been found very desirable to remove particulate material and the sulfur oxides from the loaded acceptor in separate zones. Although it is possible to remove the sulfur oxides before the particulate matter, it is preferred to free the acceptor of particulate matter first. According to the invention the removal of particulate matter can very effectively be accomplished by stripping the acceptor in a second zone with an inert gas, in particular steam. The particulate matter, which has smaller dimensions than the acceptor particles, is separated from the acceptor and is transported by the inert gas. To take maximum advantage of this size differentiation and to thereby achieve optimum separation of the acceptor particles from the particulate matter it is advantageous to interpose a barrier substantially impenetrable to the acceptor particles (because of their size) in the particulate matter removal zone through which the particulate matter carried by the inert gas can pass after initial separation is effected. To achieve this result under practical conditions, this stripping is very suitably carried out by transporting the loaded acceptor in relatively thin layers over perforated plates, and passing the inert gas through the acceptor layers via the perforations of the said plates. The perforated plates may be positioned under a slope such that the acceptor moves over the said plates by means of gravitational force.

The particulate matter can ultimately wholly or partly be separated from the inert gas (or after condensation from water in cases where steam is employed) by conventional means, e.g., with the aid of filters or with one or more cyclones and or hydrocyclones.

The sulfur oxides still bound to the acceptor after the removal of the particulate matter are removed from the acceptor material in a next zone. This regeneration step is carried out by contacting the acceptor with a suitable reducing gas such as hydrogen or hydrogen/carbon monoxide mixtures, and hydrocarbon or mixtures of hydrocarbons. Preferably, the reducing gas comprising hydrogen is diluted with one or more inert gases chosen from the group consisting of steam, nitrogen and carbon dioxide. Very suitable diluted reducing gases are gases produced by the reaction of steam and methane, or gases obtained by the partial oxidation of hydrocarbons, or off-gases emanating from a catalytic reformer.

It is preferred that the molar ratio of the inert gas and combustible compounds in the reducing gas (in general hydrogen and/or carbon monoxide and/or hydrocarbons) is from 3 to 10, preferably from 4 to 5. A preferred inert diluent is steam.

The acceptor may be transported through the regeneration zone by any suitable means, such as with the aid of bucket elevators, screw conveyors or vibrating conveyors. Since the reaction between the sulfur oxides-loaded acceptor and the reducing gas to release free sulfur dioxide is very rapid, in many cases all sulfur oxide is removed from the acceptor after a few seconds of contact with the reducing gas. It is, therefore, preferred that the third zone comprises a riser tube debouching into a cyclone through which zone the acceptor is transported by means of the reducing gas. In this case the vertical riser tube functions both as a means for transporting the acceptor and as the zone for the removal of sulfur oxides from the acceptor. In cases where the removal of sulfur oxides from the acceptor in the said riser or other means of transport is not sufficient, a moving bed reactor may be inserted for the removal of the sulfur oxides from the loaded acceptor with the aid of a reducing gas.

After the removal of the sulfur oxides, the reducing gas and the acceptor, are separated from each other by conventional gas-solids physical separation techniques. Preferably, this separation occurs in the cyclone. In the cyclone the acceptor is kept in contact with the reducing gas, to ensure complete removal of sulfur oxides from the acceptor.

During the removal of the sulfur oxides from the acceptor with a reducing gas, the temperature is very suitably in the range of from 300°–500° C and preferably between 325°–475° C. The sulfur compounds emerging from the acceptor are virtually completely in the form of sulfur dioxide.

The reducing gas which has been in contact with the acceptor now contains the sulfur originally present in the waste gases in the form of sulfur dioxide, and may have lost its reducing properties. This gas is removed from the regeneration zone, and the sulfur dioxide present therein can be recovered or concentrated by conventional means. It may be further processed by known methods to products, such as elemental sulfur, sulfuric acid or gypsum.

As the process of the invention is a non-cyclic one, the gas emanating from the regeneration zone will always have substantially the same concentration of sulfur dioxide. Therefore, this gas may conveniently be directly used for a process in which sulfur dioxide is converted into other products (e.g., into elemental sulfur in a Claus plant). This is an important advantage of the present process over known cyclic processes wherein the concentration of sulfur dioxide in the regeneration off-gas, in general, varies in time. Costly installations, such as absorbers and strippers, are needed in these latter processes to compensate for the fluctuations in the $SO_2$-concentration in order to bring the sulfur dioxide from such a regeneration off-gas in a form suited for further processing.

After removal of the sulfur oxides it is desirable to free the acceptor from any residual reducing gas before it is reintroduced into the sulfur oxide and particulate matter removal zone or before it is reactivated with an oxidizing agent according to the procedure described below. This can be readily accomplished by stripping the acceptor with inert gas. To this end the acceptor is very suitably transported in relatively thin layers over perforated plates and stripped with an inert gas which is passed through the acceptor layers via the perforations in the plates. Preferably, the perforated plates are positioned at a slope from horizontal, with the acceptor being moved over the sloped plates by means of gravitational force. Steam is preferred as inert stripping gas.

The acceptor from which the sulfur oxides have at least partly, and in most cases substantially completely been removed, may be recycled to the sulfur oxides and particulate matter removal (first) zone without reactivation. In an active acceptor the copper is, preferably, present as its oxide. After treatment with the reducing gas the acceptor contains the copper at least partly in the metallic form. When the acceptor in this form is used in the first zone the metallic copper is converted into copper oxide by the oxidizing gas present in the said first zone. However, since heat is liberated during the oxidation of copper to its oxide, an undesired rise in temperature may take place in the first zone.

For this reason it is preferred to reactivate the acceptor in a separate zone before its introduction into the first zone. In this separate zone for activation the acceptor is suitably contacted with an oxidizing agent, e.g., an oxygen-containing gas, such as air. In order to achieve reactivation the acceptor may be transported through this separate zone via any conventional technique for moving solid particles, e.g., bucket elevators, screw conveyors vibrating conveyors. It is preferred to reactivate the acceptor by contacting it with an oxygen-containing gas in a zone comprising a riser tube debouching into a cyclone. In this preferred procedure the acceptor is transported through the activation zone by means of the oxygen-containing gas used for its reactivation. During transport through the vertical riser tube oxidation of the metals present on the carrier material takes place. The temperature during transport should, preferably, be kept within the temperature range of the subsequent cross-current contacting step in the first zone but during oxidation of the metallic copper it may locally rise to a temperature beyond this range.

In the preferred embodiment of the invention relating to the reactivation zone the acceptor is separated from the oxidizing agent by the cyclone and recycled to the first zone by any suitable means, e.g., under the influence of gravitational force or by means of a conveyor. The remnant of the oxidizing agent (e.g., air) may be discharged to the stack, or be used for any other purpose, e.g., as part of the inlet air to the furnace from which the waste gases emerge.

The invention also relates to an apparatus particularly suited for carrying out the process according to the invention. The apparatus comprises a vessel for cross-current contacting of the waste gas with a moving bed of acceptor for sulfur oxides, and separate processing chambers for removal of the particulate matter from the loaded acceptor, for the removal of sulfur oxides for the loaded acceptor, and for reactivating the acceptor.

In a preferred embodiment the apparatus comprises:

A. a contacting vessel having an inlet for waste gases containing sulfur oxides and particulate matter and an outlet for waste gas substantially free of sulfur oxides and particulate matter, an internal compartment containing a moving bed of supported, copper-containing acceptor for sulfur oxides, said internal compartment being defined by perforated walls disposed inside the contacting vessel, an inlet for fresh supported copper-containing acceptor in fluid communication with said internal compartment and an outlet for said acceptor loaded with sulfur oxides and particulate matter also in fluid communication with said internal compartment, and a means for directing the flow of said waste gases and said moving bed of acceptor cross-currently to one another, said waste gas flowing through the perforated walls of said internal compartment containing said moving bed of acceptor;

B. a first purge vessel for removing particulate matter from the acceptor with a bottom inlet for purge gas and a top outlet for purge gas and particulate matter, a top inlet for acceptor material loaded with sulfur oxides and particulate matter connected to the loaded acceptor outlet of said contacting vessel and a bottom outlet for purged acceptor material, at least one perforated plate disposed in the vessel at an angle with the vertical for transporting the loaded acceptor material from its inlet to the outlet and a means for passing said purge gas through said perforated plate thereby stripping said particulate matter from said loaded acceptor during its transport on said perforated plate;

C. a first vertical riser tube debouching into a cyclone for removing sulfur oxides from the acceptor, having a bottom inlet for purged acceptor material connected to the bottom outlet of the above purge vessel and a bottom inlet for reducing gas, a cyclone top outlet for sulfur oxide-containing gas and a cyclone bottom outlet for reduced acceptor material;

D. a second purge vessel with a bottom inlet and a top outlet for purge gas, a top inlet for reduced acceptor material connected to the above cyclone bottom outlet and a bottom outlet for purged acceptor material and at least one perforated plate disposed in the vessel at an angle with the vertical for transporting acceptor material from its inlet to the outlet, and E. a second vertical riser tube debouching into a cyclone for reactivating the acceptor having a bottom inlet for purged acceptor material connected to the bottom outlet of the second purge vessel and a bottom inlet for an oxygen-containing gas, a cyclone top outlet for the oxygen-containing gas and a cyclone bottom outlet for reactivated acceptor material connected to the acceptor inlet of the above contacting vessel.

A schematical drawing of such an apparatus is given in FIG. 1. For the sake of simplicity auxiliary equipment, such as bolts, nuts, valves, heating and cooling equipment is not shown.

Flue gas is introduced via line 1 into a cross-current contacting vessel 2. The acceptor is fed to vessel 2 through line 3. The acceptor is passed through the vessel and removed therefrom via line 4. The waste gas, which was in cross-current contact with the acceptor in vessel 2 is removed therefrom via line 5, and may be led to the stack. In general, it may be partly cooled by heat transfer to air to be used for combustion in the furnace from which the off-gas emerges. The acceptor removed from the cross-current contacting vessel via line 4 is led to a vessel 6, which is provided with perforated plates 7 at a slight angle with the horizontal. The acceptor passes over the plates 7 by gravitational force, and the fly ash present thereon is removed with the aid of steam introduced via line 8. The fly ash is transported by the steam via line 9 to a cyclone 10. From this cyclone dry fly ash is removed through line 11, and a slurry of fly ash in water via line 12. The acceptor is removed via line 13 from vessel 6 to a riser 14. Via line 15 a reducing gas (for example, a mixture of steam and hydrogen) is introduced into riser 14, and the acceptor may be transported to cyclone 16. In riser 14 the $SO_2$ is removed from the acceptor. From cyclone 16 the gas, which now contains appreciable amounts of $SO_2$, is removed via line 17. The acceptor is removed from cyclone 16 via line 18 to vessel 19 equipped with perforated plates 20, which are at a slight angle with the horizontal. Steam is introduced into vessel 19 via line 21, and this steam, after having been in contact with the acceptor (which may pass over plates 20 by gravitational force) is removed via line 22 from vessel 19. Line 22 may be connected with line 17. The acceptor leaves vessel 19 through line 23 to a riser 24. Air is introduced into line 24 via line 25, and the acceptor is led to a cyclone 26 via line 24. In line 24 copper on the acceptor is oxidized to copper oxide.

From cyclone 26 the gas is removed via line 27. It may be used as feed air for the furnace from which the waste gas emerges, or it is passed to stack. The acceptor is recycled from cyclone 26 to reactor 2 via line 3.

The vessel in which the waste gas is to be contacted with the acceptor (vessel 2 in FIG. 1) may be constructed in several ways. The acceptor is to be transported through the vessel as a moving bed while being contacted cross-currently with the waste gas.

Figure 2:
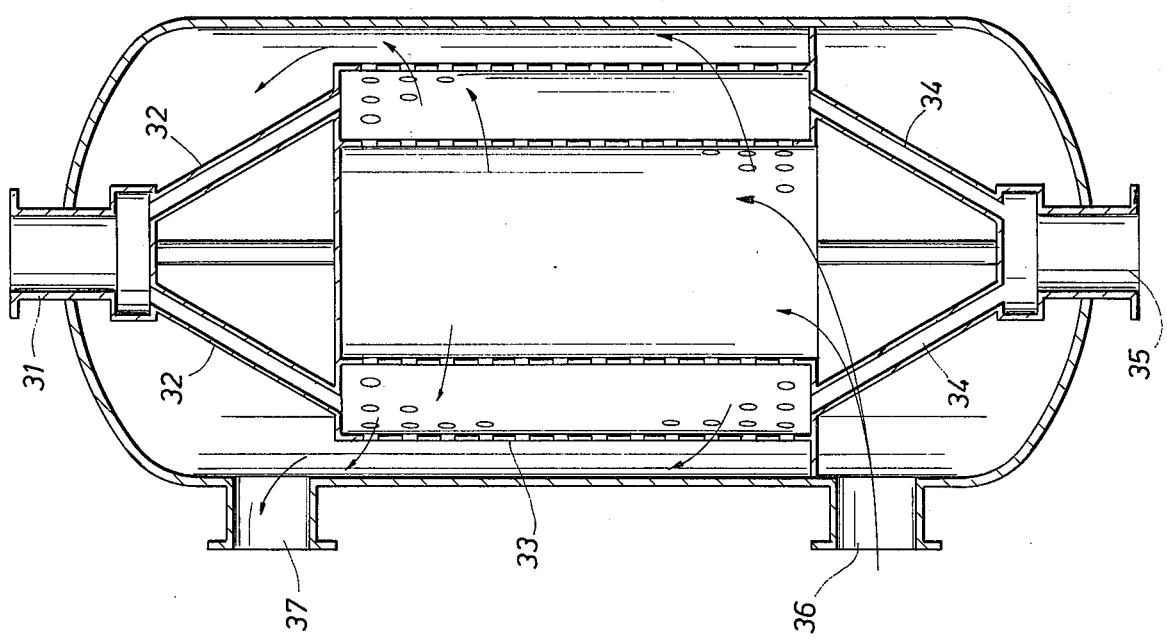

Two vessel or reactor types, which are very suitable for this purpose are shown schematically in FIGS. 2, 3 and 4, 5, respectively. FIG. 2 shows a longitudinal section and FIG. 3 a perspective fuel of a so-called cylindrical radial flow reactor.

Acceptor material enters the reactor via the top nozzle 31 and is distributed via conduits 32 into a cylindrical compartment 33 with perforated walls. On its flow downwards the acceptor is exposed to the flue gas. At the bottom of the cylindrical compartment the acceptor is removed via conduit 34 and removed from the reactor via bottom nozzle 35. The flue gas is passed from the reactor inlet 36 and via spaces between the conduits 34 into the central cone. From there it radially passes the acceptor layer present in the cylindrical compartment 33, thereby establishing the desired cross-current contact between moving acceptor particles and the waste gas. The flue gas stream at the top of the reactor leaves the reactor via outlet 37.

It will be understood that several other embodiments of a cylindrical radial flow reactor are possible. It may, e.g., contain several concentrically arranged cylindrical compartments with perforated walls through which the acceptor material is transported. In all cases the flue gases are introduced in such a way that they must at least pass through one layer of acceptor material present in a cylindrical compartment before leaving the reactor.

Figure 4:
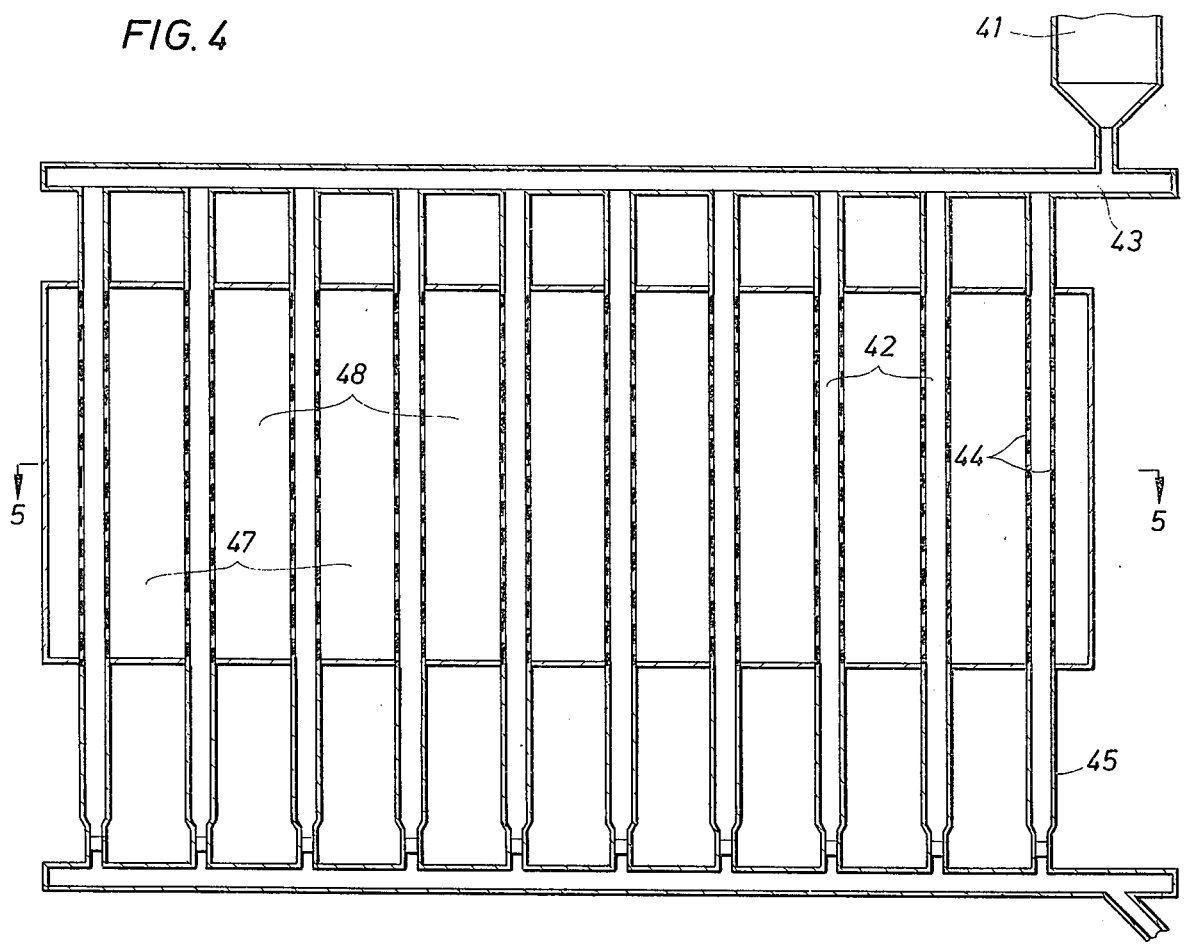
Figure 5:
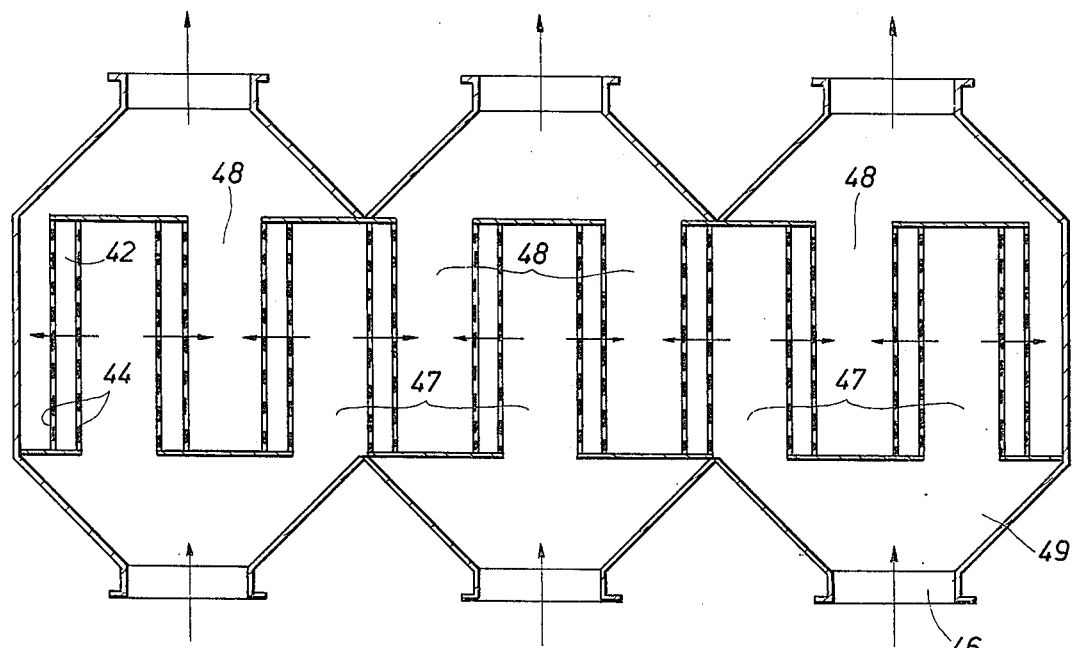

In FIGS. 4 and 5, a so-called parallel plate reactor is shown. FIG. 4 is a side view and FIG. 5 is a top view.

The acceptor material is fed to the top of the reactor by a hopper 41 and distributed at the top over a number of compartments 42 arranged in parallel (e.g., by means of a closed channel-type conveyor 43). The acceptor flows downwards through the compartments. The number of compartments and their size depend on the amount of flue gas to be treated, its width and on the allowable pressure drop. The side walls 44 of the compartments are perforated to allow for passage of the flue gas. Both top and bottom parts of the compartments are, preferably, triangular in cross-section to get an equal distribution of acceptor across the square cross area. Each compartment is equipped with a vane feeder 45 at the bottom for withdrawal of loaded acceptor. At the bottom the acceptor is collected using the same equipment as for the distribution at the top. The flue gas enters the reactor horizontally via inlets 46 and is fed into flue gas inlet chambers 47. From here it passes the acceptor layer and leaves the reactor via the flue gas outlet chambers 48. Inlet and outlet chambers are arranged alternately. Both side walls of each chamber (excluding the first and the last one) are perforated. The distribution of the flue gas across the reactor section is obtained by one or more pyramidal inlet and outlet devices 49. The outlet system is identical to the inlet device.

EXAMPLE

Flue gas of a 250 MW boiler amounting to 783,000 $Nm^3/h$ gas containing 0.16% vol. $SO_2$ and 8.7 g $Nm^3$ fly ash, is introduced at the bottom of a bi-cylindrical radial flow reactor, as described above, with a diameter of 12 meters at a temperature of 400° C and about atmospheric pressure. The layer thickness of the acceptor in each cylindrical compartment is 50 cm and the acceptor moves through the compartment by gravitational force at a rate of about 1 mm/sec. The acceptor consists of reinforced alumina comprising 5%wt of copper. Its bulk density is 1100 $kg/m^3$ and its size 3–5 mm. After passage through the two cylindrical compartments cross-currently to the moving acceptor, the purified flue gas leaves the reactor at its top. The flue gas particulate matter is reduced to 0.09 $g/Nm^3$ and its $SO_2$ content is 160 ppm vol. After leaving the bi-cylindrical radial flow reactor the acceptor is freed from particulate matter by stripping with low pressure steam in a purge vessel comprising 3 inclined perforated trays. The temperature during stripping is 390° C and the pressure is slightly above atmospheric pressure. The acceptor is introduced at the top of the purge vessel and leaves it at the bottom. A gas stream of steam and particulate matter leaves the purge vessel at its top. The acceptor now free from contaminating particulate matter is then introduced into a riser tube with an inside diameter of 1.0 meter in which it is contacted with a reducing gas comprising 15% vol. $H_2$ and introduced into the said riser tube at a rate of 15,000 kg/h. The riser debouches into a cyclone with a diameter of 2.5 m wherein acceptor and reducing gas are separated. The acceptor leaves the cyclone at its bottom and is introduced into a second purge vessel which is similar to the one described above. The conditions during stripping with steam are almost identical, i.e., 380° C and a pressure of about 1.0 $kg/cm^2$ abs. The acceptor is subsequently introduced into a second riser (diameter: 0.65 m) in which it is treated with air in order to oxidize its metallic copper to copper oxide. Air is introduced at a temperature of 30° C and at a rate of 13,500 kg/h. During the oxidation step the acceptor temperature rises to 410° C. Air and oxidized acceptor are separated from each other in a cyclone into which the second riser debouches. The diameter of this cyclone is 2.0 m. From the latter cyclone regenerated and reactivated acceptor is recycled to the top of the bi-cylindrical radial flow reactor.

What is claimed is:
1. An apparatus suitable for use in the removal of sulfur oxides and particulate matter from waste gases which comprises:
 a. a contacting vessel having an inlet for waste gases containing sulfur oxides and particulate matter and an outlet for waste gas substantially free of sulfur oxides and particulate matter, an internal compartment containing a moving bed of supported, copper-containing acceptor for sulfur oxides, said internal compartment being defined by perforated walls disposed inside the contacting vessel, an inlet for fresh supported copper-containing acceptor in fluid communication with said internal compartment and an outlet for said acceptor loaded with sulfur oxides and particulate matter also in fluid communication with said internal compartment, and a means for directing the flow of said waste gases and said moving bed of acceptor cross-currently to one another, said waste gas flowing through the perforated walls of said internal compartment containing said moving bed of acceptor;
 b. a first purge vessel for removing particulate matter from the acceptor having a bottom inlet for purge gas and a top outlet for purge gas and particulate matter, a top inlet for acceptor material loaded with sulfur oxides and particulate matter connected to the loaded acceptor outlet of said contacting vessel and a bottom outlet for purged acceptor material, at least one perforated plate disposed in the vessel at an angle with the vertical for transporting the loaded acceptor material from its inlet to the outlet and a means for passing said purge gas through said perforated plate thereby stripping said particulate matter from said loaded acceptor during its transport on said perforated plate;
 c. a first vertical riser tube debouching into a first cyclone for removing sulfur oxides from the acceptor, having a bottom inlet for purged acceptor material connected to the bottom outlet of the first purge vessel and a bottom inlet for reducing gas, a first cyclone top outlet for sulfur oxide-containing gas and a first cyclone bottom outlet for reduced acceptor material;
 d. a second purge vessel with a bottom inlet and a top outlet for a purge gas, a top inlet for reduced acceptor material connected to the first cyclone bottom outlet and a bottom outlet for purged acceptor material and at least one perforated plate disposed in the vessel at an angle with the vertical for transporting acceptor material from its inlet to the outlet, and
 e. a second vertical riser tube debouching into a second cyclone for reactivating the acceptor having a bottom inlet for purged acceptor material connected to the bottom outlet of the second purge vessel and a bottom inlet for an oxygen-containing gas, a second cyclone top outlet for the oxygen-containing gas and a second cyclone bottom outlet for reactivated acceptor material connected to the acceptor inlet of the contacting vessel.

* * * * *